W. W. WINGER.
DRAFT APPLIANCE.
APPLICATION FILED JAN. 29, 1910.
971,870.
Patented Oct. 4, 1910.
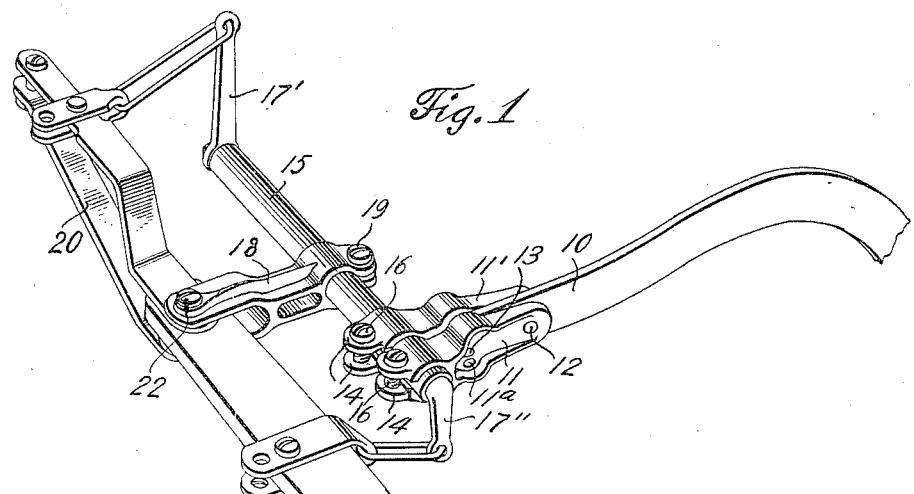
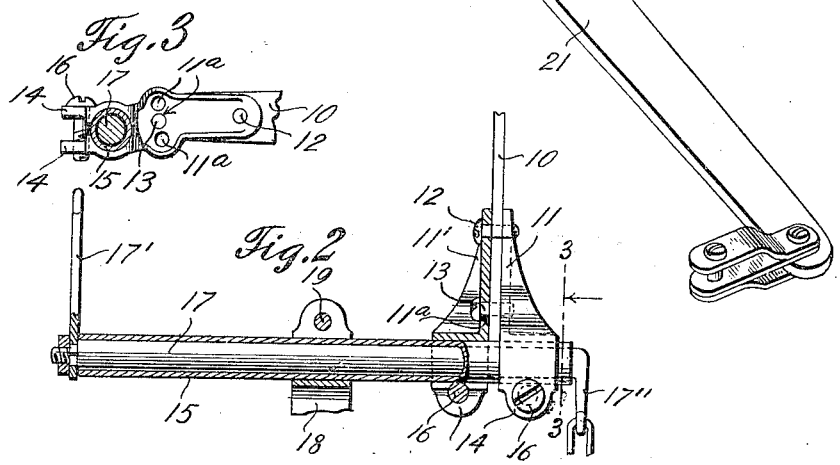
Witnesses
E. Larson
M. J. Taylor.
Inventor
W. W. Winger,
By Beeler & Robb
Attorneys

UNITED STATES PATENT OFFICE.

WILLIAM W. WINGER, OF WOLCOTT, INDIANA.

DRAFT APPLIANCE.

971,870.      Specification of Letters Patent.      Patented Oct. 4, 1910.

Application filed January 29, 1910. Serial No. 540,843.

*To all whom it may concern:*

Be it known that I, WILLIAM W. WINGER, a citizen of the United States, residing at Wolcott, in the county of White and State of Indiana, have invented certain new and useful Improvements in Draft Appliances, of which the following is a specification.

This invention relates to draft appliances of that type adapted for use especially upon agricultural implements, and relates specifically to an improvement upon the draft appliance patented to me on Sept. 28, 1909, No. 935,135.

For a full understanding of the invention reference is to be had to the following description and the accompanying drawings, in which—

Figure 1 is a perspective view of the principal parts of the invention in normal operative position; Fig. 2 is a partial plan view, partly in section, and with the crank member turned to an angle to the normal position, and Fig. 3 is a vertical section substantially on the line 3—3 of Fig. 2.

Throughout the following description and on the several figures of the drawings similar parts are referred to by like reference characters.

At 10 is indicated what may be regarded as a plow beam, to the front end of which are connected a pair of clamp members 11 and 11′, said members embracing said beam end. A pivot 12 passes through the rear end of the clamp members, whereby the said members may be adjusted vertically with respect to the beam. A bolt 13 passes through any one of a series of holes 11ᵃ of the pairs of clamp members and the extreme end of the plow beam, for securing the clamp members at any desired degree of elevation. Each clamp member comprises a pair of jaws 14 at its forward end, between which is a horizontal space of any desired form, preferably cylindrical. A tubular draft bar 15, shown as cylindrical, is securely clamped at one end within said horizontal jaw spaces, by virtue of bolts 16 which pass vertically through the respective pairs of jaws 14. A double armed crank 17 is journaled in the draft bar 15, the cranks 17′ and 17″ of which extend at right angles from the opposite ends of the main portion of said crank in opposite directions and preferably in the same plane. The arms may be of any suitable lengths, the arm 17′ being shown as longer than the other. A fulcrum bar 18 is secured to the draft bar 15 at one side of the clamp members and preferably substantially midway between the ends of the draft bar. By virtue of a bolt 19 the fulcrum bar may be adjustably clamped at any desired angle upon the draft bar and also at any suitable distance from the aforesaid beam clamp members. A pair of draft levers 20 and 21 are pivoted together at 22 and to the front end of the fulcrum bar 18. Said draft levers are respectively connected by clevises and links to the crank arms 17′ and 17″. Any suitable number of horses may be attached to the outer ends of the draft levers 20 and 21.

The several parts of this device may be made of any suitable materials or relative proportions. I do not wish to be limited in the use thereof to the exact construction illustrated.

I claim:

1. In a draft appliance, the combination with a beam, of a pair of clamp members embracing the end of the beam, means to connect said members to the beam whereby the front ends of the members may be adjusted up or down with respect to the beam end, each of said members comprising a pair of jaws with a horizontal space therebetween, a draft bar adjustably clamped at one end in the horizontal spaces of said clamp members, a double armed crank journaled in said draft bar, and a set of draft levers connected to the crank arms and to the draft bar, substantially as set forth.

2. In a draft appliance, the combination with a beam, of a pair of clamp members pivoted at their rear ends to opposite sides of the beam, means to adjustably secure said members from pivotal movement, each of said members having a pair of jaws at its forward end with a horizontal cylindrical space between the jaws, a cylindrical tubular draft bar adjustably clamped in said jaw spaces, a double armed crank journaled in said draft bar, a fulcrum bar adjustably clamped to the tubular draft bar at one side of the clamp members aforesaid and extending forwardly from the draft bar, and a pair of draft levers pivoted at their adjacent ends to the front end of the fulcrum bar and also connected to the several crank arms, substantially as set forth.

In testimony whereof I affix my signature in presence of two witnesses.

WILLIAM W. WINGER.

Witnesses:
EDWARD BLUME,
GEO. F. BAKER.